(12) United States Patent
Van Dijk (10) Patent No.: US 7,653,197 B2
(45) Date of Patent: Jan. 26, 2010

(54) SYSTEM AND METHOD OF RELIABLE FORWARD SECRET KEY SHARING WITH PHYSICAL RANDOM FUNCTIONS

(75) Inventor: Marten E. Van Dijk, Cambridge, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 289 days.

(21) Appl. No.: 10/577,756

(22) PCT Filed: Oct. 28, 2004

(86) PCT No.: PCT/IB2004/052235

§ 371 (c)(1),
(2), (4) Date: Mar. 12, 2007

(87) PCT Pub. No.: WO2005/043805

PCT Pub. Date: May 12, 2005

(65) Prior Publication Data

US 2008/0044027 A1     Feb. 21, 2008

Related U.S. Application Data

(60) Provisional application No. 60/515,319, filed on Oct. 29, 2003, provisional application No. 60/561,605, filed on Apr. 13, 2004.

(51) Int. Cl.
*H04L 9/00* (2006.01)
*G06F 7/04* (2006.01)

(52) U.S. Cl. ............... 380/44; 380/28; 380/278; 380/279; 380/280; 713/171; 713/172; 713/173; 713/174; 726/27; 726/28; 726/29; 726/30

(58) Field of Classification Search ............ 380/44
See application file for complete search history.

(56) References Cited

U.S. PATENT DOCUMENTS

2003/0219121 A1 * 11/2003 van Someren ............... 380/44

FOREIGN PATENT DOCUMENTS

EP     0 511 420 A1     4/1992

(Continued)

OTHER PUBLICATIONS

A. Juels et al, "A Fuzzy Commitment Scheme", 6th ACM Conference on Computer and Communication Security, pp. 28-36, 1999.

(Continued)

*Primary Examiner*—Longbit Chai (57) ABSTRACT

A secure solution is provided to the problem of secret key agreement. In particular, a method of reliable forward secret key sharing is disclosed between two legitimate correspondents whose profiles match sufficiently. The invention relies on a physical random function, sometimes referred to as a physical unclonable function (PUF) to provide a secure solution to the problem of secret key agreement. In one embodiment, a one-pass protocol is introduced based on Reed-Solomon codes leading to an unconditionally secure solution. In a further embodiment, the solution of the first embodiment is improved upon by providing a conditionally secure solution based on a pseudo random family of functions. In a still further embodiment, a two-pass protocol is introduced which is used exclusively for purposes of identification and authentication. In accordance with the principles of the two-pass protocol, two communications are required and unlike the one-pass protocol, the second correspondent selects the secret key K.

37 Claims, 5 Drawing Sheets

FOREIGN PATENT DOCUMENTS

EP 0511420 A1 * 11/1992

OTHER PUBLICATIONS

A. Juels et al, "A Fuzzy Vault Scheme", Proceedings of the 2002 IEEE Internatnional Symposium on Information Theory, 2002.

B. Gassend et al, "Silicon Physical Random Functions", Proceedings of the 9th ACM Conference on Computer and Communications, 2002.

Ueli M. Maurer, "Secret Key Agreement by Public Discussion from Common Information", IEEE Transactions on Information Theory, vol. 39, No. 3, May 1993.

* cited by examiner

SYSTEM AND METHOD OF RELIABLE FORWARD SECRET KEY SHARING WITH PHYSICAL RANDOM FUNCTIONS

CROSS REFERENCE TO RELATED APPLICATION

This application claims the benefit of U.S. provisional application Ser. No. 60/515,319 filed Oct. 29, 2003 and Ser. No. 60/561,605 filed Apr. 13, 2004, which the entire subject matter is incorporated herein by reference.

The present invention relates to cryptographic systems and associated methods, and more particularly to a system and method of reliable forward secret key sharing with physical random functions.

Secure delivery of information is an important goal in the field of electronic communications. Confidentiality and integrity are especially important for communicating certain types of information. This may include, for example, sensitive government information, corporate information and personal information such as medical record information. Various schemes employing encryption have been developed to address the security issues related to electronic messages.

In A. Juels and M. Wattenberg, "A fuzzy commitment scheme", $6^{th}$ ACM Conference on Computer and Communication Security}, p. 28-36, 1999, a one-pass protocol is disclosed in which information (i.e., V+A) is transmitted from a first correspondent to a second correspondent, where V is a code word and A is a (noisy) response both of length n. This protocol is disadvantageous in that it requires the communication of a minimum of n symbols and further needs an error correcting decoding algorithm to operate properly.

In A. Juels and M. Sudan, "A fuzzy vault scheme", Proceedings of the 2002 IEEE International Symposium on Information Theory, p. 408, 2002, a one-pass protocol is disclosed in which a first correspondent, Alice, computes points $(a\_i, p(a\_i))$ where $p(\bullet)$ is a polynomial and $K=p(0)$ is the secret key. Alice transmits these points in random order interleaved with a lot of random points $(x_i, y_i)$ (with the $x_i$'s distinct and unequal to any of the a_i's). The random points (on the order of $10^4$ for sets of size 22) represent what is referred to as post randomization. These are needed to keep an attacker, Eve, uncertain about the polynomial $p(\bullet)$ and to ensure security. A second correspondent, Bob 18 is able to reconstruct $p(\bullet)$ by using an errors-and-erasures RS decoding algorithm. This one-pass protocol works for unordered sets like the two-pass protocol. This method is disadvantageous due to an incredibly large communication cost resulting from the process of post randomization.

U. M. Maurer, in "Secret key agreement by public discussion from common information", IEEE Trans. on Information Theory, 39, p. 733-742, 1993 defines the distance between a first correspondent, Alice and a second correspondent, Bob, as the mutual information I(A;B) between them. In this paper, a satellite broadcasts a random binary string X where each of the correspondents, Alice and Bob as well as an attacker, Eve, receive noisy versions of the random binary string X. Multi-pass protocols, which are sub-divided into various phases including an advantage distillation phase, reconciliation phase, and privacy amplification phase, are described for the purpose of sharing a secret key. A disadvantage of this scheme is that the multi-pass protocol contains multiple communication steps between the two correspondents, Alice and Bob.

What is needed, therefore, is a simplified protocol that provides minimal communication costs and thereby overcomes the afore-mentioned disadvantages of the prior art.

The present invention provides a secure solution to the problem of secret key agreement. The invention addresses the problem of reliable forward secret key sharing between two legitimate correspondents whose profiles match sufficiently. The invention relies on a physical random function, sometimes referred to as a physical unclonable function (PUF) to provide a secure solution to the problem of secret key agreement.

In one embodiment, a one-pass protocol is introduced based on Reed-Solomon codes leading to an unconditionally secure solution.

In a further embodiment, the solution of the first embodiment is improved upon by providing a conditionally secure solution based on a pseudo random family of functions.

In a still further embodiment, a two-pass protocol is introduced which is used exclusively for purposes of identification and authentication. In accordance with the principles of the two-pass protocol, two communications are required and unlike the on-pass protocol, the second correspondent selects the secret key K.

In each of the various embodiments, it is a goal to design an efficient solution where security and robustness are simultaneously achieved in the presence of an adversary. A further goal is to minimize the use of the public communication channel. A key feature of the invention, as exemplified in each of the various embodiments, is that security is based on a computationally difficult problem.

The foregoing features of the present invention will become more readily apparent and may be understood by referring to the following detailed description of an illustrative embodiment of the present invention, taken in conjunction with the accompanying drawings, where.

Although the following detailed description contains many specifics for the purpose of illustration, one of ordinary skill in the art will appreciate that many variations and alterations to the following description are within the scope of the invention.

Accordingly, the following preferred embodiment of the invention is set forth without any loss of generality to, and without imposing limitations upon, the claimed invention.

Figure 1:
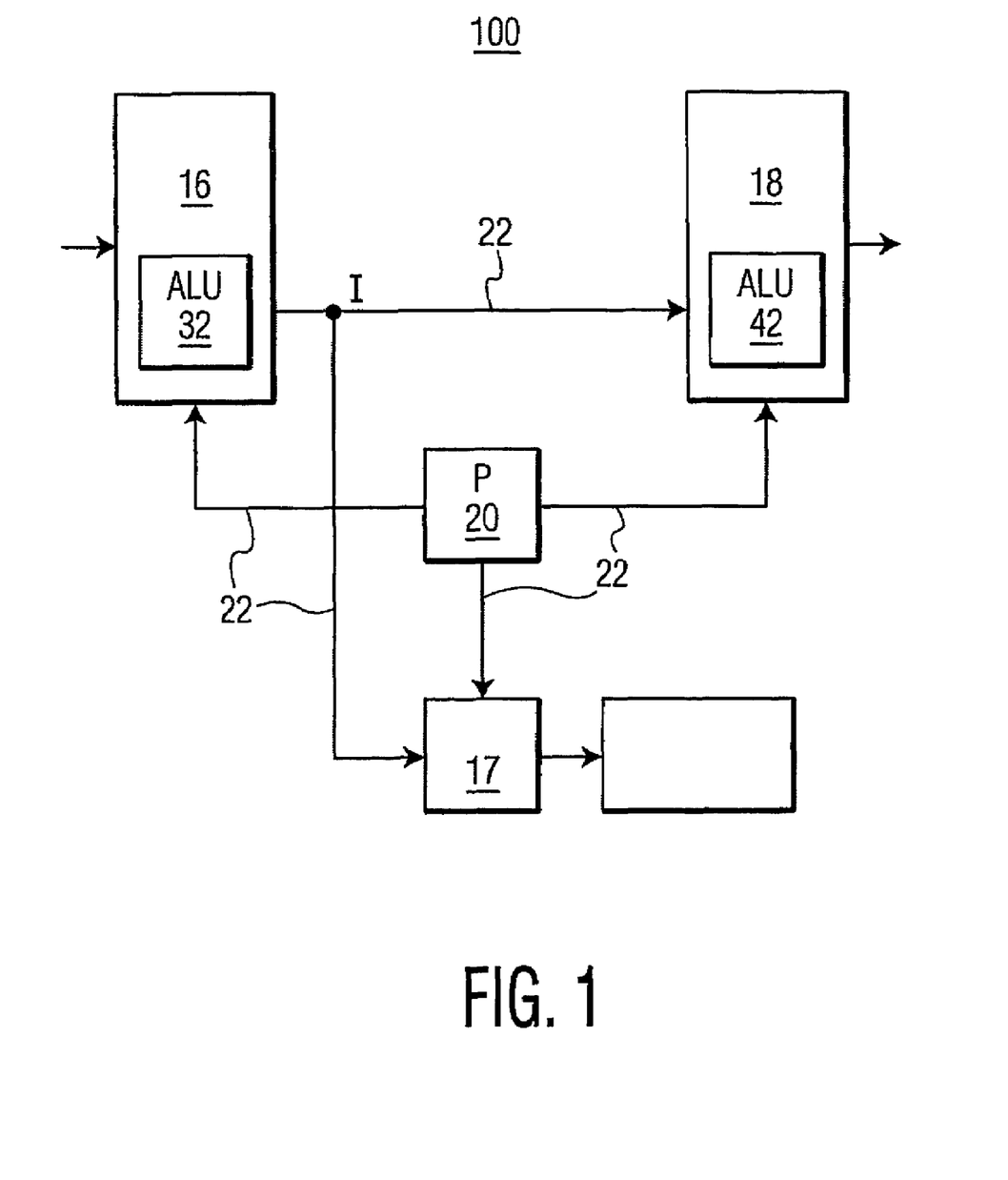
FIG. 1 is an illustration of a cryptographic system for illustrating the one-pass protocol according to an embodiment of the invention.

Referring now to FIG. 1, a cryptographic system is shown generally by the numeral 100. A pair of correspondents 16, 18, referred to as Alice 16 and Bob 18, communicate over a network 22. Each correspondent 16, 18 has an arithmetic logic unit (ALU) 32, 42. The ALU can be a general purpose computer, with a cryptographic unit, which implements the cryptographic protocols of the invention. Source P 20 is assumed to be a generic symbol generating source.

During an enrollment phase, Alice 16 issues a challenge C to source P 20 and receives a response A from source P 20. The challenge-response scheme is a scheme in which, for example, a given value (challenge) generated by Alice 16 is responded by a value (response) generated by the source P 20, commonly referred to in the art as a challenge-response pair, (C,A). Similarly, Bob 18 issues the same challenge C to source P 20 and receives a response B from source P 20, or (C,B). It is noted that responses A and B correspond to noisy versions of the same challenge C.

The symbol-sequence A received by Alice 16 from source P 20 may be written as, $$A=(a_1, \ldots a_n) \quad (1)$$

The symbol-sequence B received by Bob 18 from source P 20 may be written as, $$B=(b_1, \ldots, b_n), \quad (2)$$

The symbol-sequence E received by Eve 17, an attacker, from source P 20 may be written as, $$E=(e_1, \ldots e_n) \quad (3)$$

A secret key sharing protocol is desired in which Alice 16 is able to share a randomly selected secret key K with Bob 18. This may be achieved if the symbol-sequence B received by Bob 18 is determined to be close enough to the symbol-sequence received by Alice 16.

A standard measure of describing the distance between any two codes or symbol-sequences (e.g., A and B) is to compute the Hamming distance which simply counts up, for any pair of n bit (or symbol) codes, the number of positions in which the bits (or symbols) differ. Thus 11110000 and 01110001 would have a Hamming distance of 2 because they differ in their first and last positions. The Hamming distance between the symbol sequences A and B may be written as:

$$d_H(A,B)=1\{i:a_i \neq b_i\}1 \quad (4)$$

The basis of error correction theory is the idea that n bit codes form an n-dimensional space where a distance between any two codes can be defined. A standard method of describing the distance is the Hamming Distance. If the Hamming distance dH(A,B) between the symbol sequences A and B is less than a certain threshold tk, $$d_H(A,B)<t_k \quad (5)$$

then Alice 16 and Bob 18 will be able to share a secret key K. Whenever the Hamming distance is less than the threshold $t_k$, then the symbol sequences A and B, received by Alice 16 and Bob 18, respectively, are able to compensate for noise that is inherent in source P 20 and correct the errors between the two symbol sequences A and B to be able to share the secret key K between them.

The desired key sharing protocol should provide authenticity in the sense that, Alice 16 knows that any person with whom she successfully shares a secret key K knows a symbol sequence which is close to symbol sequence A and Bob 18 knows that any person who successfully shares a secret key with him has knowledge of a symbol-sequence that is close to symbol sequence B.

The desired key sharing protocol should provide security in the sense that any other person, such as an attacker Eve 17, who only knows the publicly transmitted information I and symbol sequence E with Hamming distance $d_H(A,E)$ greater than a certain threshold, ti, only obtains a negligible amount of information about the secret key K.

Defining the Hamming distance between Alice 16 and Eve 17 as:

$$d_H(A,E)=1\{i:a_i \neq e_i\}1 \quad (6)$$

The threshold criteria can be stated as:

$$d_H(A,E)>ti \quad (7)$$

where the threshold ti>tk.

The One-Pass Protocol

First Embodiment

One protocol that provides both the desired authenticity and security is referred to herein as a "one-pass" protocol because Alice 16 and Bob 18 use the public channel only once to share the secret key K. One-pass protocols are desirable in the sense that they minimize the use of the public communication channel 22. In accordance with the one-pass protocol, a first correspondent (Alice 16) generates a randomly selected secret key K to be shared with a second correspondent (Bob 18).

With continued reference to FIG. 1, to define how a one-pass protocol may be implemented in accordance with the first embodiment, assume that source P 20 initially gives Alice 16, Bob 18 and Eve 17 responses A, B and E, respectively, as part of their respective challenge-response sessions, (C,A), (C,B) and (C,E). As soon as Alice 16 and Bob 18 receive their respective responses, it is assumed that Alice 16 and Bob 18 desire to share a secret key K together to allow them to use the secret key K in cryptography primitives to exchange sensitive data over the public channel.

It should be noted, however that any communication between Alice 16 and Bob 18 over the public channel 22 will also be communicated to Eve 17, an attacker, trying to model the physical system P 20 and steal the secret key K.

Two requirements are re-stated from above. First, if the response from source P 20 to Alice 16 and Bob 18 are close enough, they will be able to share the secret key K. That is, if the Hamming distance $d_H(A,B)$ is less than a certain threshold $t_k$, (see eq. 4) they will be able to share a secret key K. Second, if the responses by source P 20 to the attacker Eve 17 and Alice 16 are far enough apart, then the one-pass protocol should be secure. That is, if the Hamming distance $d_H(A,E)$ is greater than a certain threshold ti, (see eq. 5) the one-pass protocol should be secure.

As noted above, Alice 16 desires to share a random secret key K she selects with Bob 18, where the secret key K can be written as:

$$K=(K_1, \ldots K_k) \quad (8)$$

In accordance with the first embodiment, Alice 16 and Bob 18 will be able to share a secret key K using a one-pass protocol in which Alice 16 transmits redundant information I to Bob 18 in such a way that Bob 18 is able to generate the secret key K such that if Eve 17, the attacker, receives the same redundant information I it will not help her in generating information about the key K.

The desired one-pass protocol, according to the first embodiment, consists of an encoding phase and a decoding phase, described as follows:

Encoding Phase

In the encoding phase, Alice 16 chooses a secret key $K=(K_1, \ldots K_k)$ and encodes the secret key K along with $A=(a_1, \ldots a_n)$ into a Reed Solomon code word W, which can be written as:

$$W=(K_1, \ldots, K_k, a_1, \ldots a_n, p_1, \ldots, p_{d-1}) \quad (9)$$

This leads to d−1 parity symbols P as output $$P=(p_1, \ldots p_{d-1}) \qquad (10)$$

Which are considered as redundant symbols (i.e., redundant information I). The d−1 parity symbols P are introduced to create a certain minimum distance d in the code for correcting erasures and errors to provide a second correspondent (e.g., Bob 18) with the ability to reconstruct the secret key K transmitted from a first correspondent, Alice 16. It is noted that the parity symbols P of equation (10) are assumed not to be in error because they are transmitted over a public channel 22 which implements an additional coding layer to correct for noise.

The Reed-Solomon codeword W of equation (9) has a length, [n+k+(d−1)], a dimension, [n+k], and a minimum distance of d, commonly written as:

$$[n+k+d-1, n+k, d] \qquad (11)$$

As is well known, the Reed-Solomon code is systematic which implies that any (n+k) positions form an information set. The minimum distance is d, which implies that any set of d−1 erasures (i.e., positions for which no entry is received or computed) can be corrected. This also follows from the fact that the non-erasure positions form an information set.

A key feature of the invention is that only the (d−1) parity symbols P are transmitted from Alice 16 to Bob 18 over the public communication channel 22 to permit reconstruction of the secret key K by Bob 18 in accordance with the one-pass protocol of the invention. The (d−1) parity symbols P are considered to be the redundant information I in the present embodiment. By contrast, the prior art bears a higher communication cost by transmitting the vector sum V+A of an entire Reed-Solomon codeword V plus the response vector A over the public channel 22, where both V and A have a length n and V may be written as, $$V=(K_1, \ldots, K_k, R_1, \ldots, R_{(n-k-d+1)}, p_i, \ldots, p_{(d-1)})M \qquad (12)$$

where the $R_{i's}$ are randomly chosen symbols and M is a publicly available random invertible matrix.

Decoding Phase

Bob 18 receives the parity symbols $P=(p_1, \ldots p_{d-1})$, transmitted as the redundant information I by Alice 16 over the public channel 22 and performs Reed-Solomon decoding to reconstruct W, in order to determine the secret key K.

To reconstruct the codeword W, Bob 18 performs Reed-Solomon decoding by constructing a word W' which includes question marks in the first k positions, followed by the symbol sequence B (from challenge-response pair (C,B)) in the next n positions, and the parity symbols P in the last (d−1) positions.

$$W'=(?_1, \ldots, ?_k, b_1, \ldots b_n, p_1, \ldots p_{d-1}) \qquad (13)$$

Each of the k question marks in the word W' represents an erasure. Erasures are supplied for these first k positions of word W' because upon receiving the parity symbols P from Alice 16 over the public channel, Bob 18 does not know the symbols which comprise the secret key K and uses erasures for these k unknown symbols.

A key feature of the invention is that transmitting only the redundant information I (i.e., the (d−1) parity symbols P) over the public channel from Alice 16 to Bob 18 will be sufficient, with a high degree of probability, to allow Bob 18 to extract or determine the secret key K. This is in sharp contrast to the prior art which transmits n symbols, as discussed above.

It should be noted that any of the positions of B, $b_1$ through $b_n$, in the word W' constructed by Bob 18 may be in error. However the positions of these errors are unknown to Bob 18.

To summarize, as compared with the codeword W transmitted by Alice 16, Bob's constructed word W' includes k erasures, represented as question marks, in the first k positions and $d_H(A,B)$ errors ($a_i \neq b_i$ for $d_H(A,B)$ unknown positions i)

Knowing that the Reed-Solomon code has a minimum distance d, a classical errors-and-erasures decoding algorithm corrects Bob's constructed word W' to Alice's transmitted codeword W, if and only if, $$k+2d_H(A,B) \leq d-1 \qquad (14)$$

Re-written, $$d_H(A,B) \leq (d-1-k)/2 \qquad (15)$$

Therefore if and only if the Hamming distance $d_H(A,B)$ between Alice's and Bob's respective responses A and B satisfies the inequality of equation (15) will Bob 18 be able to distill the secret key K. It is noted that it is a probabilistic determination as to whether or not Bob 18 will be able to distill the secret key K. However, the probability of failure in determining the key K can made to be exceedingly small by increasing n and d with a scaling factor where n represents the number of response symbols from the response-challenge session conducted during enrollment, i.e., responses A and B, and (d−1) represents the number of parity symbols transmitted from Alice 16 to Bob 18 over the public channel 22 with a scaling factor.

From the law of large numbers the Hamming distance between A and B is approximately Gaussian distributed with the average (mean) proportional to the scaling factor and the standard deviation proportional to the square root of the scaling factor. Therefore the probability of failure (i.e., equation 15 not being satisfied) is exceedingly small for an increasing scaling factor.

As previously stated, the (d−1) parity symbols of $P=(p_1, \ldots p_{d-1})$, constitute the redundant information I that is transmitted over the public channel 22. This affords the attacker Eve 17 some knowledge towards attaining the secret key K. Eve 17 constructs the word W", $$W''=(?_1, \ldots, ?_k, e_1, \ldots e_n, p_1, \ldots p_n) \qquad (16)$$

It can be shown that the word W" constructed by Eve 17 does not contain any information about the key K if the inequality of equation (17) is satisfied $$d_H(A,E) \geq d-1 \qquad (17)$$

That is, if the number of errors in the word W" constructed by Eve 17 is at least equal to (d−1) then no information about the secret key K is leaked to Eve 17. This is because the positions outside the error positions are part of an information set, which implies that each key K is equally likely, hence, Eve 17, does not obtain any information about K.

In sum, in accordance with the first embodiment, it is shown that Alice 16 and Bob 18 are able to share a secret key K using a one-pass protocol where Alice 16 transmits redundant information I to Bob 18 in such a way that Bob 18 is able to generate the secret key K such that if Eve 17, the attacker, receives the same redundant information I it will not help her in generating information about the secret key K.

The One-Pass Protocol

Second Embodiment

In the present embodiment of the one-pass protocol, Alice 16 transmits to Bob 18 over the public channel 22, the (d−1) parity symbols P, as information I, as in the first embodiment. However, in addition to transmitting the (d−1) parity symbols P, Alice 16 also transmits the hash of her response A, i.e., h(A). It is noted that while the present embodiment is described using a hash function, the use of any arbitrary function may be selected from a pseudo random family of functions that is statistically independent of the physical system P 20.

In the present embodiment, Alice 16 transmits the (d−1) parity symbols P and the hash of A, h(A) as the information I over the public channel 22 to Bob 18:

$$I=(P,h(A)) \tag{18}$$

The information I expanded may be written in expanded form as, $$I=((p_1,\ldots p_{d-1}),(h(a_1),\ldots,h(a_n))) \tag{19}$$

As in the previous embodiment, Bob 18 attempts to reconstruct the secret key K from the information I transmitted over the public channel 22 by Alice 16.

Upon receiving the information I from Alice 16, Bob 18 attempts to reconstruct the secret key K by first calculating the hash of all of his response symbols B:

$$h(B)=(h(b_1),\ldots,h(b_n)) \tag{20}$$

Next, Bob 18 computes the set S which includes all positions i for which there is a match between the hash of the $a_i$'s and the hash of the $b_i$'s, $$h(a_i)=h(b_i) \tag{21}$$

The set S is computed as:

$$S=\{i:h(a_i)=h(b_i)\}=\{i:a_i=b_i\} \tag{22}$$

The second equality in equation (22) holds with overwhelming probability. In other words, the noise characteristic is assumed to be such that with overwhelming probability $h(a_i)=h(b_i)$ implies $a_i=b_i$.

As in the first embodiment, Bob 18 constructs a word W'' with erasures (?) in the first k positions and the parity symbols P in the last (d−1) positions. However, in the present embodiment, the word W' does not include errors, it only includes erasures in the positions outside the set S and outside the parity symbols P. This occurs because the parity symbols P are assumed to be correctly received over the public channel 22 and therefore contain no errors or erasures. Also, the first k positions are treated as all erasures.

$$W'=(?_1,\ldots,?_k,b_1,\ldots?,?,\ldots b_n,p_1,\ldots p_{d-1}) \tag{23}$$

All the other positions in W' (i.e., all of the elements in B with positions in S) are not in error with overwhelming probability. This means that, compared to the previous embodiment in which errors-and-erasures decoding is used to distill the key K, in the present embodiment, a significant reduction in complexity is realized in that erasure-only decoding is sufficient to reconstruct W and hence the secret key, K. It is noted, however, that the reduction in complexity presents a tradeoff. Specifically, the present embodiment transmits extra information, namely, the hash of A, h(a) which is in addition to the parity symbols P transmitted in the first embodiment. However, the one-pass protocol of the present embodiment represents a factor 2 improvement over the prior art leading to a reduction in communication costs as compared to the prior art, which is described more fully as follows.

Recalling equations (14) and (15) from the first embodiment, re-written here as equations (24) and (25):

$$k+2d_H(A,B)\leq d-1 \tag{24}$$

$$d_H(A,B)\leq(d-1-k)/2 \tag{25}$$

It is well known that to correct any single error in a Reed-Solomon codeword, two parity symbols are required. Further, to correct a single erasure, a single parity symbol is required. In the present embodiment, erasure-only decoding is sufficient to reconstruct the secret key K thereby providing a factor 2 improvement. As such, equation (24) can be re-written without the 2 multiplier as equation (26). If this inequality is satisfied, Bob 18 will be able to distill the secret key K.

$$k+d_H(A,B)\leq d-1 \tag{26}$$

In the present embodiment, the attacker Eve 17 receives over the public channel and therefore possesses:

$$\text{Eve 17 possesses}\rightarrow(E,h(A),P) \tag{27}$$

As in the previous embodiment, if the Hamming distance $d_H(A,E)$ between the respective responses A and E is greater than (d−1) then Eve 17 only obtains a negligible amount of information about the secret key K.

$$d_H(A,E)\geq d-1 \tag{28}$$

It is noted that the factor 2 improvement of the present embodiment means that the gap between the thresholds $t_k$ and $t_i$ is significantly smaller.

Figure 2A:
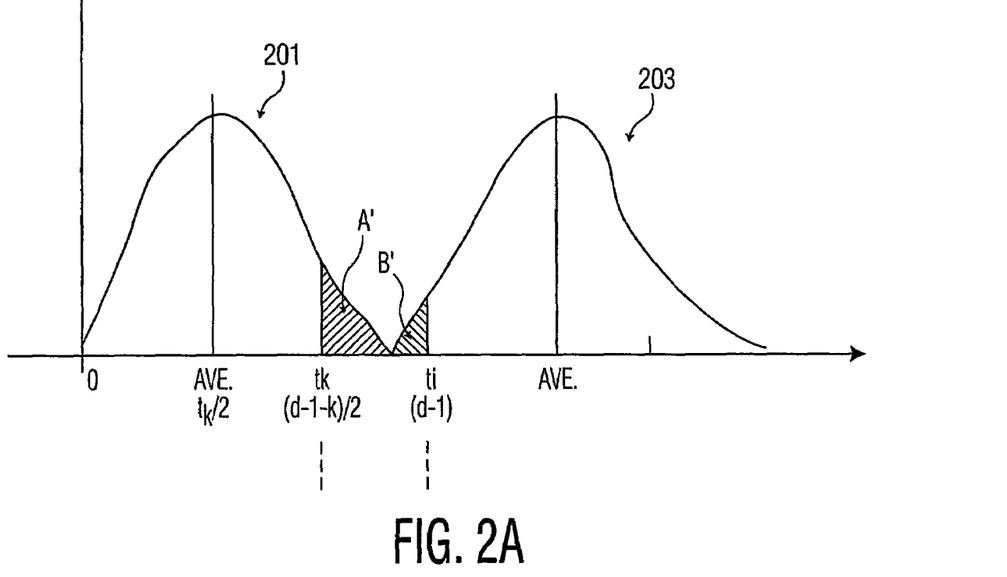
FIGS. 2a & 2b are Gaussian distribution curves illustrating the factor 2 improvement of the one-pass protocol according to an embodiment of the invention.
Figure 2B:
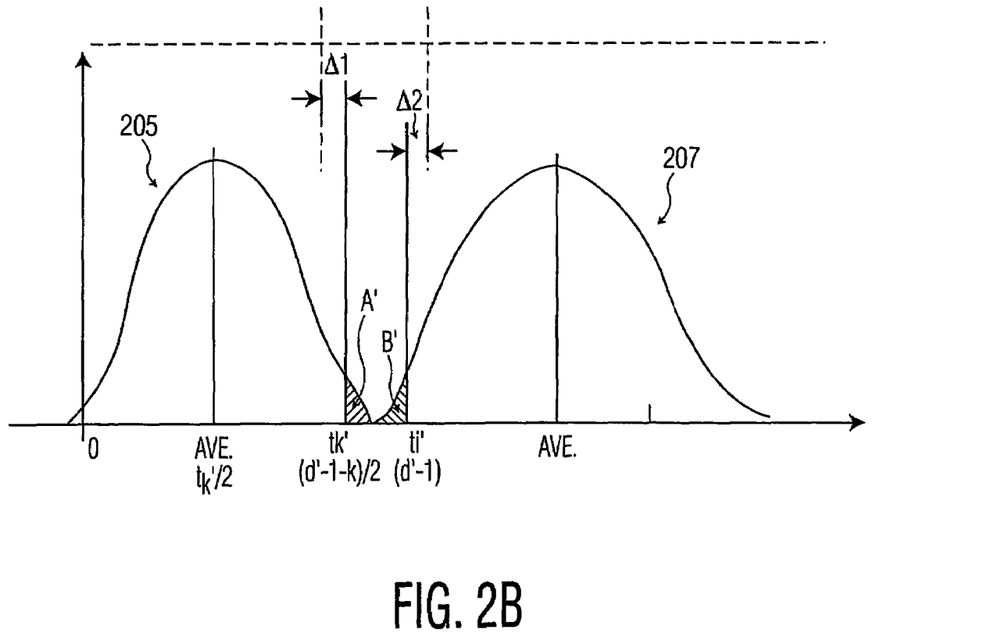

From the law of large numbers, the Hamming distance between A and B, $d_H(A,B)$, and the Hamming distance between A and E, $d_H(A,E)$, are approximately Gaussian distributed both with an average proportional to the scaling factor and a standard deviation proportional to the square root of the scaling factor. Since the gap between $t_k$ and $t_i$ is smaller due to the factor 2 improvement, a larger standard deviation is allowed to achieve robustness and security. Hence, the scaling factor can be smaller compared to prior art where the gap between the thresholds $t_k$ and $t_i$ is as large as the gap of the first embodiment. This point is more fully illustrated with respect to FIG. 2.

Referring first to FIG. 2a, there is illustrated two Gaussian distributions, a first Gaussian distribution 201 and a second Gaussian distribution 203. The first Gaussian distribution 201 is centered about $t_k/2$ which is ½ the threshold $t_k$, generally representing the average number of errors in the respective responses received by Alice and Bob, i.e., A and B. The probability of being in region A' of the Gaussian curve 201 equals the probability that Bob 18 cannot reconstruct the secret key K. As explained above, this is due to the fact the number of errors between A and B exceeds the threshold $t_k$.

The standard deviation of the Gaussian curve 201 is proportional to the square root of n (the length of the responses A and B). By scaling up the length of the responses n by a scaling factor, the standard deviation scales up proportionally by the square root of the scaling factor and the average scales up proportionally by the scaling factor. The implication of this scaling is that the probability of the tail region (region A') gets smaller. It therefore follows that Bob 18 has a higher probability of reconstructing the key K. It should be noted that curve 201 does not reflect the effect of scaling up the length of the response n.

Referring now to the second Gaussian curve 203 of FIG. 2a, which represents the number of errors between Alice 16 and the attacker Eve 17, the tail region (region B') is the probability that the attacker Eve 17 will obtain information about the secret key K. It is therefore desirable to make this tail region (region B') as small as possible. The exact same scaling is performed as previously described. Namely, by scaling up n by a scaling factor, the standard deviation scales up proportionally by the square root of the scaling factor while the average scales up proportionally by the scaling factor. The implication of this scaling is that the probability of the tail region (region B') gets smaller. It therefore follows that Eve 17 has a lower probability of obtaining information about the key K. It should be noted again that curve 203 does not reflect the effect of scaling up the length of the response n.

Referring now to FIG. 2b, the respective Gaussian curves 205 and 207 reflect the factor 2 improvement of the second embodiment over the first discussed above. It is also noted that that d'/n' is chosen to be smaller than d/n. This implies that the threshold $t_i'/n' < t_i/n$ (the $t_i/n$ threshold shifts left by an amount delta__1). However, because of the factor 2 improvement $t_k'/n' > t_k/n$ (the $t_k/n$ threshold shifts right by an amount delta__2). It is therefore shown that there is a convergence of the gap between $t_k/n$ and $t_i/n$ from both sides. Note, however, that the position of the peaks (i.e., the averages) relative to the response length are identical for the curves of FIGS. 2a and 2b. Because the regions A' and B' are smaller, if similar probabilities are to be maintained from FIG. 2a to FIG. 2b (i.e., before and after the factor 2 improvement) a larger standard deviation is allowable. This implies the allowance of a wider distribution instead of a more peaked distribution from a scaling up of n by a scaling factor. The wider distribution is compensated for by having a larger threshold $t_k$ and a lower threshold $t_i$. A wider distribution corresponds to a smaller scaling factor.

With regard to the communication costs, it is noted that in the present embodiment the communication cost is proportional to h(A) and in the prior art, the communication cost is proportional to A, which is in both cases equals $$n' = n * \text{Scaling factor} \qquad (29)$$

where n' is equal to the length of the response A received by Alice 16 in the response-challenge session (C,A) conducted during the enrollment phase. By way of comparison, in the present embodiment, the scaling factor is reduced compared to the prior art thereby leading to relatively lower communication costs, namely, $$(d-1) * \text{Scaling factor} \qquad (30)$$

where (d−1) is generally much smaller than n.

Physically Unclonable Functions (PUFS)

Prior to discussing practical applications of the previously described embodiments, it is instructive to first briefly review some general principles of physically unclonable functions or PUFS. Sometimes referred to as physically random functions.

A PUF is a random function that maps challenges to responses in a way that is difficult to predict and that is embodied by a physical device, and that verifies the following properties: (1) Easy to evaluate—The physical device is easily capable of evaluating the function in a short amount of time and (2) Hard to characterize—From a polynomial number of plausible physical measurements (e.g., determined by a chosen number of challenge-response pairs), someone who is not in possession of the physical device (e.g., the IC or chip), and who only has available to him or her a polynomial amount of resources (e.g., time, matter, etc.) can only extract a negligible amount of information about the response to a randomly chosen challenge. It is noted that 'short' amount of time and 'polynomial' are relative to the size of the physical device, which is the security parameter. In particular, short means linear or low degree of polynomial. PUFS are described in more detail in B. Gassend, D. Clarke, M van Dijk, and S. Devadas in "Silicon physical random functions" (in Proceedings of the 9$^{th}$ ACM Conference on Computer and Communications Security (CCS'02), 2002), incorporated herein by reference in its entirety.

PUFs are sometimes referred to as physical one-way functions in the sense that it is hard to reconstruct the physical system from the challenge-response pairs. However, unlike a one-way function, a PUF does not require going from the response to the challenge to be hard. For a PUF, all that matters is that going from a challenge to a response without the benefit of using the physical device is hard.

As a particular example, consider a silicon PUF, i.e., a semiconductor integrated circuit ("IC" or "chip"). The IC or chip can be considered as a physical system or device that embodies a PUF. While IC's can be reliably mass-manufactured to have identical digital logic functionality, each IC is unique in its delay characteristics due to inherent variations in manufacturing across different dies, wafers and processes. While digital logic functionality relies on timing constraints being met, different IC's with the exact same digital functionality will have unique behaviors when these constraints are not met, because their delay characteristics are different. Therefore, such different chips will, in general, map the same input to different outputs (i.e., the challenge-response pairs). Thus, the IC or chip is an example of a complex physical system that includes a physical random function or PUF, where the PUF maps an input to an output in a way that is (1) easy to evaluate and (2) difficult to predict based on the design of the chip. In other words, due to the manufacturing variations in the different chips, it is almost impossible to predict what the precise output (response) of the chip will be for a given input (challenge).

Example 1

The following example is meant to illustrate various features of the invention but in no way is meant to limit the scope of the invention to the specific embodiment and use described.

In the present exemplary application of the first and second embodiments, the one-pass protocol is now described in the context of a physical device (a processor) that embodies a physical random function or PUF. The application refers to the certified execution of a program with encrypted input data transmitted from a first correspondent (e.g., Alice 16) to a second correspondent (e.g., Bob 18).

Figure 3:
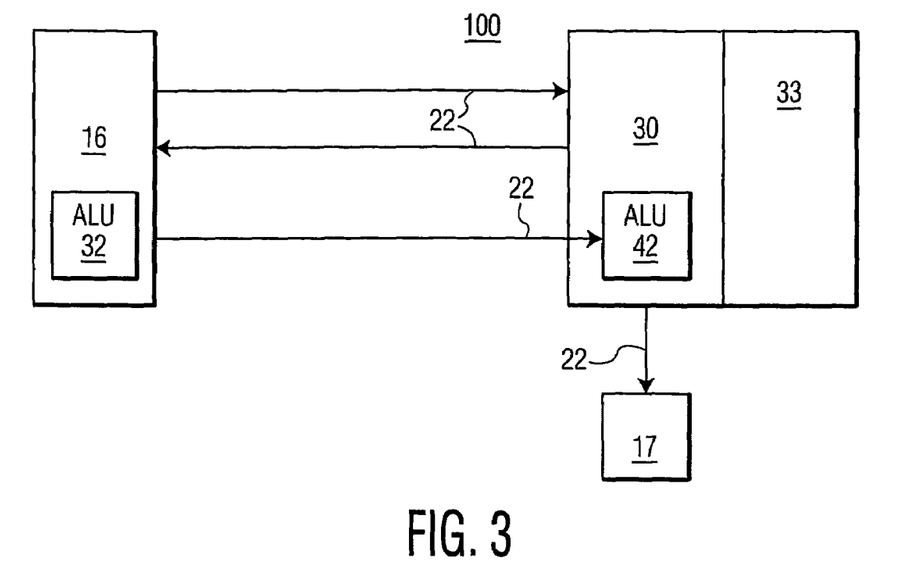
FIG. 3 is an illustration of a cryptographic system for illustrating the one-pass protocol according to another embodiment of the invention.

FIG. 3 illustrates a cryptographic system 100 according to an embodiment of the invention. FIG. 3 illustrates a processor 30 which embodies a PUF 33. The processor 30 can be thought of as playing the role of Bob 18 in FIG. 1 and the PUF 33 can be thought of as playing the role of the source P 20 in FIG. 1. Unlike FIG. 1 in which Bob 18 and the source P 20 are separate entities (de-coupled), in FIG. 3, the processor 30 and the PUF 33 are shown coupled together.

In the example shown, Alice 16 wishes to run a program (code) on processor 30. During an enrollment phase, Alice 16 sends a challenge C to the PUF 33 and receives a response A as shown. At a later time, subsequent to enrollment, Alice 16 desires to run a program on processor 30. To do so, Alice 16 selects a secret key K. Alice 16 supplies (1) the secret key K, (2) the response A to the challenge C in the challenge-response session issued during enrollment as input to a Reed-Solomon encoder to generate a codeword W. This leads the generation of (d−1) redundant parity symbols P. Depending upon the embodiment, if the protocol of the first embodiment is employed, Alice 16 constructs:

$$I=(hash(K),P) \quad (31),$$

and if the protocol of the second embodiment is employed, Alice 16 constructs:

$$I=(hash(K),P,h(A)) \quad (32)$$

During the execution phase, Alice 16 supplies the following items to the processor 30,
- C (the challenge presented during enrollment)
- I (from either equation 31 or 32, depending upon the chosen embodiment)
- the program (software) to be run on processor 30 (which may be encrypted with the secret key K), and
- the input data encrypted with the secret key, K.

Upon receiving the challenge C, during enrollment, the processor 30 (Bob) queries the PUF 33 in a challenge-response session and receives a response B, i.e., (C,B).

Upon receiving the parity symbols P, during execution, the processor 30 constructs a word W' in accordance with one of the protocols of the first or second embodiment discussed above. The processor 30 constructs the word W' by including question marks (?) on the k positions corresponding to the secret key K. If the protocol of the second embodiment is used, erasures are added to certain of the positions of the response B. Finally, irrespective of which protocol is used, the transmitted parity information, i.e., the (d−1) parity symbols P are added to the last part of the word W'. The word W' is then supplied as input to a Reed-Solomon decoder in ALU 42 to reconstruct the original codeword, W, as described above to extract the secret key K.

$$W=(K,A,P) \quad (33)$$

As illustrated in equations (31) and (32), as part of the transmitted redundant information I, Alice 16 also transmits to the ALU 42 of processor 30 the hash(K) over the public channel which may be used by the processor 30 to verify whether the secret key K was reconstructed correctly by the ALU 42. This step is a safeguard against the probability of too many errors occurring which leads to miss-correction or a decoding failure. Once the ALU 42 of the processor 30 reconstructs the secret key K it can then compute the hash(K) to determine whether it matches the hash(K) transmitted by Alice 16.

With the secret key K extracted, the processor 30 decrypts the encrypted data with the secret key K to get back the original data for use by the program.

After execution of the program, the processor 30 certifies the output using the secret key K and/or may encrypt the output using the key K to be sent back to Alice 16. Upon receiving the encrypted output, Alice 16 may then use the key K to check the certificate and to decrypt the output. In this manner, the output is being properly authenticated using the key K.

In the described scenario, it is further assumed that the Eve 17, an adversary, is listening to the public channel and is able to gain access to the processor 30 at an early stage, i.e., prior to execution. In so doing, Eve 17 performs a number of experiments to discern the operation of the processor 30 using, for example, machine learning algorithms. For example, Eve 17 could run millions of arbitrary challenges to create a software model of processor 30. At some point, Eve 17 returns the processor 30 undetected.

A key feature of the invention, as exemplified in the present application, is that while Eve 17 is able to construct a software model of the processor 30 using an arbitrarily large number of challenges, the model will have a large degree of error in it. This is true because, at some point in time, if Eve 17 intercepts the challenge C transmitted from Alice 16 to the processor 30, given that there are an exponentially large number of challenges that could be posed, the probability that the challenge C, transmitted by Alice 16 to the processor 30 will result in a known response from Eve 17's software model is exceedingly small in a statistical sense.

The Two-Pass Protocol

Figure 4:
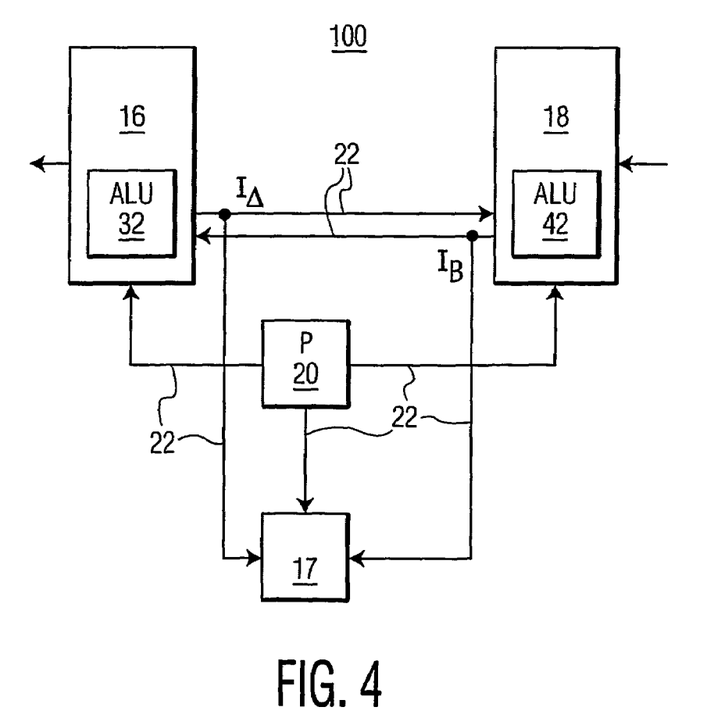
FIG. 4 is an illustration of a cryptographic system for illustrating the two-pass protocol according to yet another embodiment of the invention.

FIG. 4 is an illustration of a cryptographic system 100 according to an embodiment of the invention. In particular, FIG. 4 illustrates an exemplary cryptographic system 100 for illustrating the two-pass protocol of the invention. As shown in FIG. 4, Alice 16 transmits $I_A$ to Bob 18, Bob 18 selects a key K, and transmits $I_B$ to Alice 16, in the meantime Eve 17 listens to all public communication. Source P 20 provides responses A, B, and E to Alice 16, Bob 18 and Eve 17 respectively.

In the two-pass protocol, Alice 16 first computes $$I_A=h(A)=(h(a_1), \ldots, h(a_n)) \quad (36)$$

which Alice 16 transmits to Bob 18. Upon receiving information $I_A$ from Alice 16 over the public channel, Bob 18 computes the set S which includes all positions i for which there is a match between the hash of the $a_i$'s and the $b_i$'s $$h(a_i)=h(b_i) \quad (37)$$

The set S is computed as:

$$S=\{i:h(a_i)=h(b_i)\}=\{i:a_i=b_i\} \quad (38)$$

The second equality in equation (38) holds with overwhelming probability. The set S represents the set of matching positions of the hash of the response symbols A with the hash of the response symbols B. For example, assume that A and B include 12 symbols respectively and that positions 1, 3, 7 and 8 match in A and B. The set S in the instant example, can be then written as $$S=\{1,3,7,8\} \quad (39)$$

Next, Bob 18 transmits the set S back to Alice 16 as redundant information $I_B$. This transmission constitutes the second communication of the two-pass protocol. Upon receiving the set S, Alice 16 is now aware of which positions match and extracts only those $a_i$'s from A in the positions that match. At this point, both Bob 18 and Alice 16 know the information in common which results in a joint shared key $$J=(a_j)\_\{j \text{ in } S\}=(b_j)\_\{j \text{ in } S\} \quad (40)$$

To create a joint shared secret key K, privacy amplification is used. In one implementation, the joint shared key J is compressed by multiplication with a publicly available random matrix. In an alternate implementation, a publicly available hash function is used on J.

The adversary Eve 17 has in her possession, (1) E from source P3 (i.e., the simulated response), (2) $I_A=h(A)$, i.e., the hash of each of the $a_j$'s and (3) the set $S=I_B$ (the positions in agreement between Alice 16 and Bob 18).

$$\text{Eve 17 possesses} \rightarrow (E,h(a),S) \quad (40)$$

written in expanded form, $$\text{Eve 17 possesses} \rightarrow ((e_1, \ldots e_n),(h(a1), \ldots, h(an)),S) \quad (41)$$

The present two-pass protocol embodiment provides disadvantages and advantages. One disadvantage of the two-pass protocol is that certified execution with encrypted input is not possible. This is because if the input is encrypted, then Alice 16 needs to know the secret key K beforehand, but in the two-pass protocol Alice 16 is not allowed to select the key beforehand. One advantage of the two-pass protocol is that no Reed-Solomon coding is required. Another advantage is that Alice 16 does not reveal to Eve 17 A, from her challenge-response, completely to Bob 18.

A further advantage is that Bob 18 (the processor 30) is in full control as to whether Alice 16 has enough in common with Bob 18 (the processor 30), as represented by the set S, to share a key. In other words, Bob 18 (the processor 30) is the final arbiter as to whether the information provided by Alice 16 is sufficient to warrant the sharing of the secret key K.

A still further advantage of the present embodiment is that A, B, and E can be unordered sets instead of vectors. In this case, consider A as a set, Alice 16 orders the set and sends h(A) as described in equation (35) above. Bob 18 (the processor 30) receives $h(A)=(h(a_1), \ldots)$ and he compares $h(b_i)$ with each of the received $h(a_j)$'s. If there is a match, then with overwhelming probability $b_i=a_j$ and j is put in the set S.

The following is a specific application of the two-pass protocol in which the first correspondent (Alice 16) transmits unencrypted data to the second correspondent (Bob 18) to be processed or executed by Bob 18 and returned to Alice 16 for certification.

Example 2

The following example is meant to illustrate various features of the invention but in no way is meant to limit the scope of the invention to the specific embodiment and use described.

With continued reference to FIG. 4, an application of the two-pass protocol is referred to as certified execution with encryption. In this example, Alice 16 wishes to transmit a program (code) to be run on processor 30 and be convinced that the output returned from the processor 30 was actually processed by processor 30 and not by a clone. To be assured that the program will only be processed by the processor 30, Alice 16 needs to share a secret key with the processor 30.

In contrast with the one-pass protocol, and the previous example, Alice 16 transmits the program (software or code) and the associated input data to be run by the program to the processor 30 in unencrypted form.

In accordance with the principles of the two-pass protocol, the processor 30 (or second correspondent), and not Alice 16 (the first correspondent), creates a secret key to certify and encrypt the output data generated from running the program on processor 30 which will be transmitted in encrypted and certified form back to Alice 16. Upon receiving the output data in encrypted form, Alice 16 distills the secret key, decrypts the output and checks the certificate to provide assurance that processor 30 performed the required operations and not a clone.

This process is now described in greater detail as follows.

During an execution phase, Alice 16 constructs and transmits to the processor 30, the following:

C, the challenge issued by Alice 16 during the challenge-response session $I_A$, the redundant information derived from response A the program (software) for processing the input data input data Upon receiving $I_A$, the processor 30 selects a secret key K and computes $I_B$ by using $I_A$, B and the selected secret key K, (where B is a response from the PUF 33 corresponding to the challenge C transmitted from Alice 16). The processor 30 executes the program transmitted from Alice 16 and certifies and encrypts the output with the secret key K and transmits the encrypted output back to Alice 16. That is, Alice 16 receives from the processor 30 in return, $I_B$ redundant information derived from response B certified and encrypted program output data (both using secret key K)

Upon receiving the encrypted output over the public channel, Alice 16 uses $I_A$, $I_B$ and A to distill the secret key K. Once the secret key K is distilled by Alice 16, the encrypted output and certificate may be decrypted using the secret key K and the certificate is checked for authenticity.

Example 3

The following example is meant to illustrate various features of the invention but in no way is meant to limit the scope of the invention to the specific embodiment and use described.

Figure 5:
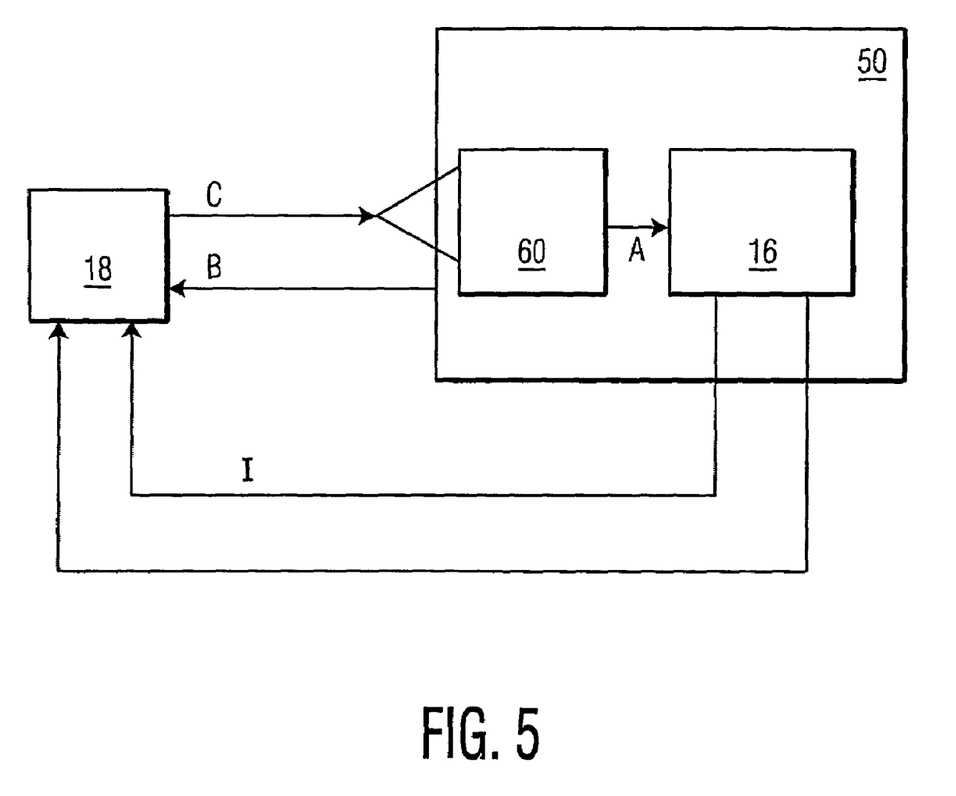
FIG. 5 is an illustration of a cryptographic system for illustrating a smart-card application according to an embodiment of the invention.

FIG. 5 is an example of a smartcard application in which an optical PUF 30 is embedded in a smartcard 50 and is used for authentication and identification. In the present example, a processor 30 (Alice), shown coupled together with the Optical PUF 60, chooses a secret key K.

During an enrollment phase, in which Bob 18 (a bank including a plurality of ATM machines) is in physical contact with the smartcard 50, Bob 18 (the bank) issues a challenge C, in the form of a laser beam, to the Optical PUF 60 and a detector at the backside of the Optical PUF 60 detects the interference pattern of the impinging laser and outputs to Bob 18 (the bank) a response B to the challenge C, referred to as challenge-response pair (B, C).

Some time after the enrollment phase, the smartcard 50 may wish to securely communicate with Bob 18 (the bank), possibly via one of its many ATM machines to perform a transaction. To do so, upon inserting the smartcard 50 into the bank's ATM machine (Bob 18), the bank's ATM (Bob 18) provides the same challenge C to the smartcard 50 as it presented during enrollment. Once again, a detector at the backside of the Optical PUF 60 of smartcard 50 computes a response A to the bank's ATM challenge C which is output to Alice 16 (the processor). Due to environmental and measurement noise, response A and response B may be different, (see eqs. 1 and 2 and the discussion above).

Upon Alice 16 (the processor) receiving the response A, Alice 16 (the processor) generates a secret key K and creates a codeword W based on the response A and the key K, as discussed above. From the generated codeword W, Alice 16 (the processor) computes a message I where I represents redundant information. The redundant information I is transmitted back to Bob 18 (the bank's ATM) along with the ATM transaction, encrypted and certified with the key K. Bob 18 (the bank's ATM) will be able to reconstruct the secret key K if the responses A and B are close enough to one another and be able to decrypt and certify the encrypted transaction. This is possible, if and only if the Hamming distance between the respective responses, $d_H(A,B)$ is small enough, i.e., less than the threshold $t_k$ (see eq. 5).

Further, an adversary Eve 17, may at some point have taken possession of the smartcard 50 and attempted to build a software model to try to extract useful information from other smartcards with similar PUFs. However, the adversary Eve 17 who uses the software model and other smartcards to create a simulated response E cannot obtain any information about the secret key K because the responses A and E will be far enough apart. That is, the Hamming distance dH(A,E) will be greater than a threshold $t_i$ (see eq. 7).

Example 4

The following example is meant to illustrate various features of the invention but in no way is meant to limit the scope of the invention to the specific embodiment and use described.

Figure 6:
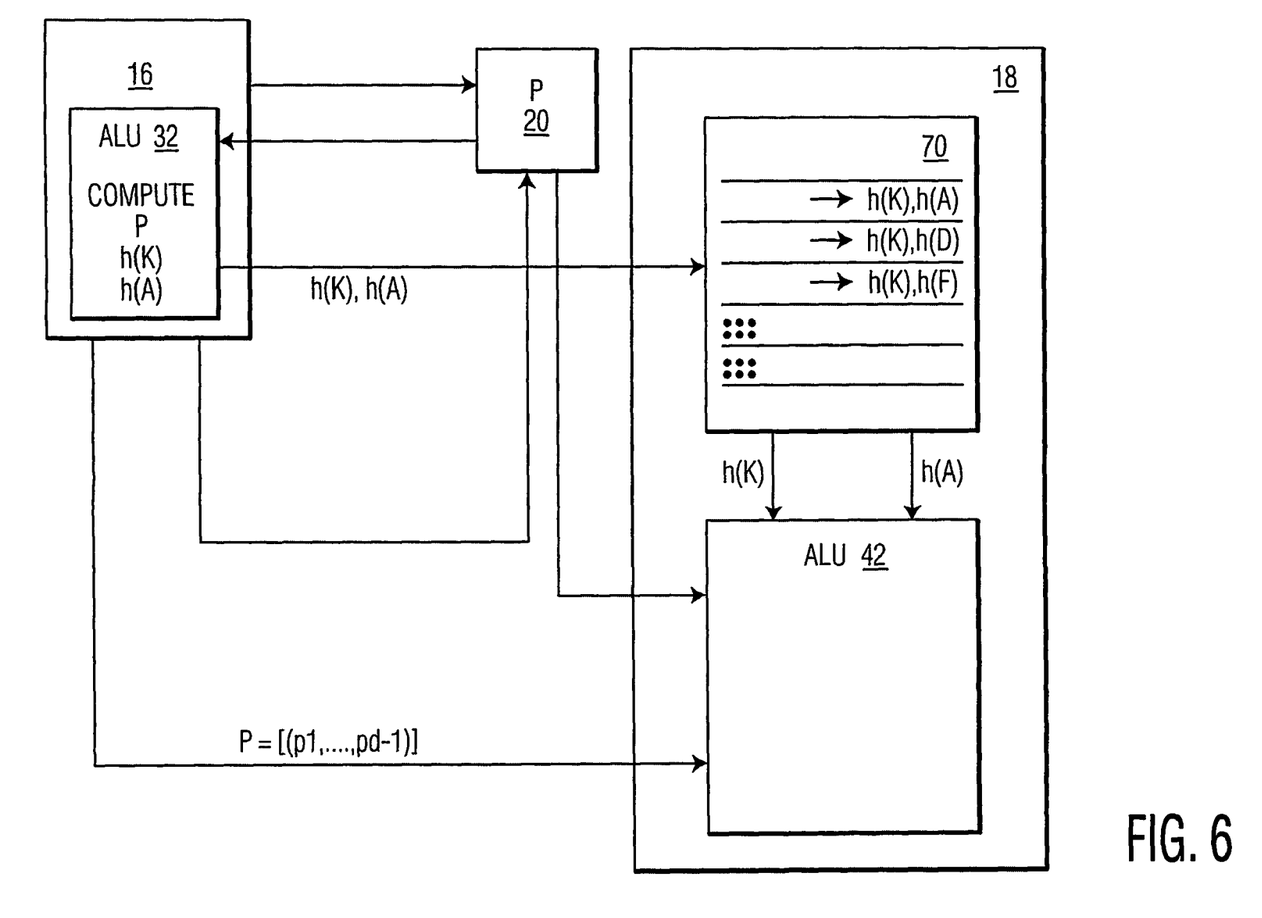
FIG. 6 is an illustration of a cryptographic system for illustrating a biometric application according to an embodiment of the invention.

FIG. 6 is an example of a biometric application in which a physical system P 20 measures Alice's fingerprint X. That is, during an enrollment phase, Alice 16 uses the physical system P 20 to measure Alice's fingerprint X. The resulting measurement A is used by Alice 16 to compute redundant information I, where I, $$I=[h(K),h(A),P] \quad (42)$$

Where:

h(K)—the hash of a randomly selected secret key K, selected by Alice 16, h(A)—the hash of the Alice's response A, and $P=[p_1, \ldots, p_{d-1}]$ The first two elements of I, namely, h(K) and h(A) are provided to Bob 18 (e.g., who plays the role of an ATM machine) who stores these values in a database 70. Since the database 70 contains images of one-way functions, security is not compromised if the database is published.

Bob 18 (the ATM) may measure Alice's 16 fingerprint a second time ($2^{nd}$ Measurement X). This gives Bob 18 (the ATM) the measured fingerprint B. Similar to that described above with respect to the PUF, A and B represent measurements made at different times, possibly using different measurement devices. In general, A and B are not equal to one another. However, because A and B are measurements of the same fingerprint X, the Hamming distance between them, $d_H(A,B)$ is small. This allows Bob 18 (the ATM) to use the method of the invention to reconstruct the secret key K and check its commitment.

In the present example, the role of Eve 17, an attacker, is to try to obtain copies from Alice's fingerprint by using, for example, a disposed coffee cup which contains Alice's fingerprints. Eve's version of the fingerprint is E and is more noisy, so even with access to the public database (h(K) and h(A)) an access to public communication P, Eve cannot obtain any information about the secret key K.

Although this invention has been described with reference to particular embodiments, it will be appreciated that many variations will be resorted to without departing from the spirit and scope of this invention as set forth in the appended claims. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) every "means" may be represented by the same item or hardware or software implemented structure or function; and e) each of the disclosed elements may be comprised of hardware portions (e.g., discrete electronic circuitry), software portions (e.g., computer programming), or any combination thereof.

The invention claimed is:

1. A method of secret key agreement between a first and a second correspondent, the method comprising the acts of:
    (a) said first correspondent receiving a response A, from a source P, said first correspondent comprising a first arithmetic logic unit of a processor;
    (b) said second correspondent receiving a response B from said source P, said second correspondent comprising a second arithmetic logic unit of a processor;
    (c) said first correspondent generating (d−1) parity symbols as an output of a codeword W whose input includes said response A and a secret key K selected by said first correspondent;
    (d) said first correspondent transmitting said (d−1) parity symbols over a public communication channel to said second correspondent; and
    (e) said second correspondent generating a codeword W' whose input includes said (d−1) parity symbols and said response B to determine said secret key K;
    wherein the secret key K may be determined from said (d−1) parity symbols and said response B by satisfying an inequality, $$dH(A,B)<=(d-1-k)/2$$

where
    dH(A,B) is a Hamming distance between symbol sequences A and B,
    d is a minimum distance, and
    k is a number of symbols in the secret key K.

2. The method of claim 1, wherein said responses A and B are received by said respective first and second correspondents responsive to a challenge C generated from said respective first and second correspondents.

3. The method of claim 1, wherein said response A is comprised of a sequence of symbols of the form A=(a1, . . . an).

4. The method of claim 1, wherein said response B is comprised of a sequence of symbols of the form B=(b1, . . . bn).

5. The method of claim 1, wherein said secret key K is comprised of a sequence of symbols of the form K=(k1, . . . kk).

6. The method of claim 1, wherein the codeword W' is a Reed-Solomon codeword.

7. The method of claim 1, wherein the secret key K cannot be determined by someone other than said first and second correspondent if the following inequality is satisfied, $$dH(A,E)>=d-1$$

where:
    B is a symbol sequence obtained by an attacker attempting to learn the secret key K,
    dH(A,E) is a Hamming distance between the symbol sequences A and E.

8. A method of secret key agreement between a first and a second correspondent, the method comprising the acts of:
    during an enrollment phase:
    (a) sending to a source, a challenge C, from a first correspondent at a time t1, wherein said first correspondent is a first computer;
    (b) said first correspondent receiving said response A to said challenge C;

(c) sending to said source, said challenge, from said second correspondent B at a time t2, wherein said second correspondent is a second computer;
(d) said second correspondent receiving a response B to said challenge C, during an encoding phase, said first correspondent:
(a) selecting a secret key K;
(b) forming a codeword W using said secret key K and said response A to generate (d−1) parity symbols P;
(c) transmitting said (d−1) parity symbols P to said second correspondent (18) over a public communication channel;

during a decoding phase, said second correspondent:
(a) using said d−1 transmitted parity symbols and said response B to construct a codeword W' to determine the secret key K if said response A and response B match within a selected tolerance;

wherein d is a minimum distance for correcting erasures and errors to provide said second correspondent with an ability in conjunction with said response B to determine the secret key K transmitted from said first correspondent and where d is a distance that enforces a metric on a bit sequence.

9. The method of claim 8, wherein said response A is comprised of a sequence of symbols of the form A=(a1, ... an).

10. The method of claim 8, wherein said response B is comprised of a sequence of symbols of the form B=(b1, ..., bn).

11. The method of claim 8, wherein said secret key K is comprised of a sequence of symbols of the form K=(k1, ..., kk).

12. The method of claim 8, wherein the secret key K may be determined from said codeword W' if and only if an inequality is satisfied $$dH(A,B) <= (d-1-k)/2$$

where dH(A,B) is a Hamming distance between symbol sequences A and B,
d is the minimum distance, and
k is a number of symbols in the secret key K.

13. The method of claim 8, wherein the codeword W' is a Reed-Solomon codeword.

14. The method of claim 8, wherein the secret key K cannot be determined from someone other than said first and second correspondent if and only if the following inequality is satisfied:

$$dH(A,E) >= d-1$$

where
E is a symbol sequence obtained by an attacker attempting to learn the secret key K,
dH(A,E) is a Hamming distance between the symbol sequences A and E.

15. A method of secret key agreement between a first and a second correspondent, the method comprising the acts of:
said first correspondent receiving a response A from a source, wherein said first correspondent is a first computer;
said second correspondent receiving a response B from a source, wherein said second correspondent is a second computer;
said first correspondent generating (d−1) parity symbols as an output of a codeword W whose input includes said response A and a secret key K selected by said first correspondent;

said first correspondent transmitting said (d−1) parity symbols and a pseudo-random function evaluated in A, over a public communication channel to said second correspondent; and
said second correspondent generating a codeword W' whose input includes said (d−1) parity symbols, said pseudo-random function evaluated A, and said response B, to determine said secret key K selected by said first correspondent if said response B matches response A within a minimum distance for correcting erasures and errors;

wherein d is a minimum distance for correcting erasures and errors to provide said second correspondent with an ability in conjunction with said response B to determine the secret key K transmitted from said first corespondent and wherein d is a distance that enforces a metric on a bit sequence.

16. The method of claim 15, wherein the pseudo-random function is a hash function of the form h(A)=(h(a1), ..., h(an)), where A is the response A from said source P.

17. The method of claim 15, wherein said response A is comprised of a sequence of symbols of the form A=(a1, ... an).

18. The method of claim 15, wherein said response B is comprised of a sequence of symbols of the form B=(b1, ..., bn).

19. The method of claim 15, wherein said secret key K is comprised of a sequence of symbols of the form K=(k1, ..., kk).

20. The method of claim 15, wherein the secret key K may be determined from said codeword W' if the inequality is satisfied, $$dH(A,B) <= (d-1-k)$$

where
dH(A,B) is a Hamming distance between symbol sequences A and B,
and
k is a number of symbols in the secret key K.

21. The method of claim 15, wherein the codeword W' is a Reed-Solomon codeword.

22. The method of claim 15, wherein the secret key K cannot be determined from someone other than said first and second correspondent if the following inequality is satisfied:

$$dH(A,E) >= d-1$$

where
E is an attacker attempting to learn the secret key K,
dH(A,E) is a Hamming distance between the symbol sequences A and E, and
d is the minimum distance.

23. A method of secret key agreement between a first and a second correspondent, the method comprising the acts of:
during an enrollment phase:
sending to a source, a challenge C, from said first correspondent at a time t1, wherein said first correspondent is a first arithmetic logic unit of a processor;
receiving said response A to said challenge C;
sending to said source, said challenge C, from said second correspondent at a time t2, wherein said second correspondent is a second arithmetic logic unit of a processor;
during an encoding phase:
said first correspondent selecting a secret key K;
forming a codeword W using said secret key K, a response A received by said first correspondent during an enrollment phase and d−1 parity symbols P;

transmitting said d–1 parity symbols P and h(A) a pseudo-random function of A from said first correspondent to said second correspondent over a public communication channel;

during a decoding phase:
using said d–1 transmitted parity symbols and said pseudo-random function evaluated in A by said second correspondent to construct a codeword W' to determine the secret key K if said response A matches response B match sufficiently;

wherein d is a minimum distance for correcting erasures and errors to provide said second correspondent with an ability in conjunction with said response B to determine the secret key K transmitted from said first correspondent by satisfying a Hamming distance inequality.

24. The method of claim 23, wherein the pseudo-random function is a hash function $h(A)=(h(a\_1), \ldots, h(a\_n))$.

25. The method of claim 23, wherein said response A is comprised of a sequence of symbols of the form $A=(a1, \ldots an)$.

26. The method of claim 23, wherein said response B is comprised of a sequence of symbols of the form $B=(b1, \ldots, bn)$.

27. The method of claim 23, wherein said secret key K is comprised of a sequence of symbols of the form $K=(k1, \ldots, kk)$.

28. The method of claim 23, wherein the secret key K may be determined from said codeword W' if the inequality is satisfied, $$dH(A,B)<=(d-1-k)$$

where
dH(A,B) is a Hamming distance between symbol sequences A and B,
and
k is a number of symbols in the secret key K.

29. The method of claim 23, wherein the codeword W' is a Reed-Solomon codeword.

30. The method of claim 23, wherein the secret key K cannot be determined from someone other than said first and second correspondents if the following inequality is satisfied:

$$dH(A,E)>=d-1$$

where
E is a symbol sequence obtained by an attacker attempting to learn the secret key K,
dH(A,E) is a Hamming distance between the symbol sequences A and E.

31. A method of secret key agreement between a first and a second correspondent, the method comprising the acts of:
said first correspondent receiving a response A from a source P, where A is a set of symbols, said first correspondent being a first computer;
said second correspondent receiving a response B from said source P, where B is a set of symbols, said second correspondent being a second computer;
said first correspondent ordering the set of symbols A into a sequence, $a1, \ldots, aN$;
said first correspondent computing a pseudo-random function of the ordered set of symbols A, h(A);
said first correspondent transmitting $h(A)=(h(a1), \ldots h(a_j))$, where $i=1 \ldots n$, to said second correspondent; and;
said second correspondent computing a pseudo-random function of the ordered set of symbols B, $h(b_j)$, where $j=1 \ldots n$, for each symbol in the set B;
said second correspondent computing a set S which includes all positions j for which there exists an element in B such that $h(a_j)=h(b_j)$;
said second correspondent transmitting the set S back to said first correspondent; and
both first and second correspondents extracting a joint key J based on the symbols aj, j in S and for those symbols b in set B for which $h(a_j)=h(b_j)$.

32. The method of claim 31, further comprising the act of extracting a secret key K from said joint key J using privacy amplification.

33. The method of claim 32, wherein using said privacy amplification includes using one of a random matrix multiplier for multiplication with the joint key J and the joint key J evaluated in a hash function.

34. The method of claim 31, wherein said responses A and B are received by said respective first and second correspondents responsive to a challenge C generated from said respective first and second correspondents.

35. The method of claim 31, wherein said response A is comprised of a sequence of symbols of the form $A=(a1, \ldots a_j)$.

36. The method of claim 31, wherein said response B is comprised of a sequence of symbols of the form $B=(b1, \ldots, b_j)$.

37. The method of claim 31, wherein said secret key K is comprised of a sequence of symbols of the form $K=(k1, \ldots, kk)$.

* * * * *